United States Patent
Maruyama et al.

(10) Patent No.: US 9,964,697 B2
(45) Date of Patent: May 8, 2018

(54) OPTICAL FIBER

(71) Applicant: FUJIKURA LTD., Tokyo (JP)

(72) Inventors: Ryo Maruyama, Sakura (JP);
Shoichiro Matsuo, Sakura (JP);
Shunichirou Hirafune, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days. days.

(21) Appl. No.: 15/506,943

(22) PCT Filed: May 24, 2016

(86) PCT No.: PCT/JP2016/065276
§ 371 (c)(1),
(2) Date: Feb. 27, 2017

(87) PCT Pub. No.: WO2016/190297
PCT Pub. Date: Dec. 1, 2016

(65) Prior Publication Data
US 2017/0285257 A1   Oct. 5, 2017

(30) Foreign Application Priority Data
May 27, 2015   (JP) .................. 2015-107030

(51) Int. Cl.
*G02B 6/036* (2006.01)
*G02B 6/02* (2006.01)
(Continued)

(52) U.S. Cl.
CPC ....... *G02B 6/02004* (2013.01); *G02B 6/0281* (2013.01); *G02B 6/03627* (2013.01);
(Continued)

(58) Field of Classification Search
CPC .......... G02B 6/0204–6/02023; G02B 6/03627
See application file for complete search history.

(56) References Cited

U.S. PATENT DOCUMENTS 7,076,139 B1   7/2006 Aikawa et al.
2011/0211796 A1*   9/2011 Bookbinder ....... G02B 6/03627
385/126

(Continued)

FOREIGN PATENT DOCUMENTS

EP   1806599 A1   7/2007
JP   3725523 B2   12/2005
(Continued)

OTHER PUBLICATIONS

Yamanaka et al., Ultra-high density optical fiber cable with "Spider Weeb Ribbon", Proceedings of the 61st IWCS Conference, (2012), pp. 2-4. (12 pages).

(Continued)

*Primary Examiner* — Jerry Rahll
(74) *Attorney, Agent, or Firm* — Westerman, Hattori, Daniels & Adrian, LLP

(57) ABSTRACT

An optical fiber includes: a core; and a clad which is formed so as to surround an outer circumference of the core concentrically with the core, the clad having at least an inner cladding layer adjacent to the outer circumference of the core and an outer cladding layer formed on an outer circumference of the inner cladding layer, wherein a refractive index of the outer cladding layer is Δ3, and an outer circumference radius of the outer cladding layer is r3, a relationship of Δ1max>Δ3>Δ2min is satisfied, a relationship of Δ3−Δ2min≤0.08% is satisfied, a relationship of r1<r2<r3 is satisfied, a relationship of 0.35≤r1/r2≤0.55 is satisfied, a cable cut-off wavelength is less than or equal to 1260 nm, and an MFD at a wavelength of 1310 nm is 8.6 μm to 9.2 μm.

6 Claims, 1 Drawing Sheet

(51) Int. Cl.
*G02B 6/028* (2006.01)
*G02B 6/42* (2006.01)
*G02B 6/36* (2006.01)
*G02B 6/38* (2006.01)
*G02B 6/125* (2006.01)
*G02B 6/12* (2006.01)

(52) U.S. Cl.
CPC ............ *G02B 6/125* (2013.01); *G02B 6/3616* (2013.01); *G02B 6/3818* (2013.01); *G02B 6/4289* (2013.01); *G02B 2006/12119* (2013.01)

(56) References Cited

U.S. PATENT DOCUMENTS

| 2013/0044987 A1 | 2/2013 | Bickham et al. |
| 2013/0136409 A1 | 5/2013 | Kumano et al. |

FOREIGN PATENT DOCUMENTS

| JP | 2009-237341 A | 10/2009 |
| JP | 2012-37782 A | 2/2012 |
| JP | 2013-520711 A | 6/2013 |
| JP | 2014-526066 A | 10/2014 |
| WO | 2006/043698 A1 | 4/2006 |
| WO | 2011/106293 A1 | 9/2011 |
| WO | 2013/021759 A1 | 2/2013 |
| WO | 2013/028513 A1 | 2/2013 |
| WO | 2014/135054 A1 | 9/2014 |

OTHER PUBLICATIONS

"ITU-T G.652", Characteristics of a single-mode optical fibre and cable, (2009), (21 pages).

Office Action dated Aug. 1, 2017, issued in counterpart Japanese Application No. 2016-564278. (7 pages).

Extended (supplementary) European Search Report dated Feb. 20, 2018, issued in counterpart European Application No. 16800002.4 (7 pages).

Office Action dated Jan. 30, 2018, issued in counterpart Japanese Application No. 2016-564278. (3 pages).

\* cited by examiner

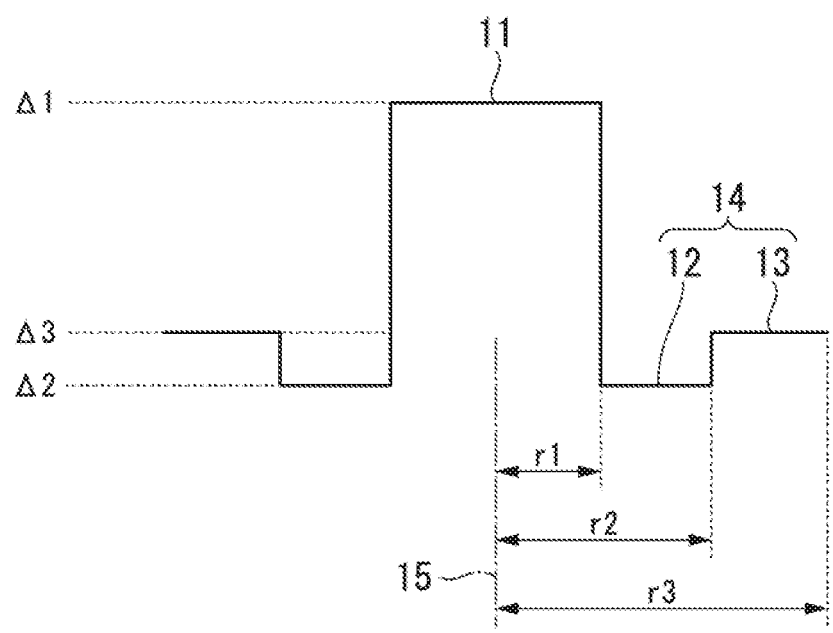

OPTICAL FIBER

TECHNICAL FIELD

The present invention relates to an optical fiber.

Priority is claimed on Japanese Patent Application No. 2015-107030, filed on May 27, 2015, the content of which is incorporated herein by reference.

BACKGROUND ART

As one of techniques to increase the packaging density of optical fibers which are mounted in an optical fiber cable, a small-diameter and high-density cable as described in Patent Document 1 and Non-Patent Document 1 has been proposed. In the small-diameter and high-density cable, unlike a cable structure such as a slot rod or a loose tube, a sheath is directly provided on a cable core, and therefore, local bending being applied to an optical fiber cannot be avoided. In general, light confined in a core of an optical fiber leaks out of the core due to bending, that is, a loss occurs. For this reason, in the small-diameter and high-density cable, it is necessary to mount an optical fiber having good bending resistance.

As means for reducing a bending loss of an optical fiber, (1) increasing the refractive index (a relative refractive index difference Δ with respect to a clad) of a core region, (2) providing a trench layer, (3) providing holes around a core, and the like can be adopted. An optical fiber having a reduced bending loss (a low bending loss optical fiber) can be mounted in the small-diameter and high-density cable.

PRIOR ART DOCUMENTS

Patent Documents

[Patent Document 1] Japanese Unexamined Patent Application, First Publication No. 2009-237341

Non-Patent Documents

[Non-Patent Document 1] M. Yamanaka et al, Ultra-high density optical fiber cable with "Spider Web Ribbon" Proceedings of the 61st IWCS Conference, 2-4, 2012.

SUMMARY OF THE INVENTION

Problems to be Solved by the Invention

The low bending loss optical fiber described above has a good bending loss characteristic, and on the other hand, a reduction in bending loss is in the trade-off relationship with a reduction of a mode field diameter (MFD), and therefore, a reduction in MFD is inevitable. For this reason, in a case where the low bending loss optical fiber is connected to a general-purpose single-mode fiber (SSMF, compliant with, for example, ITU-T G. 652), occurrence of mismatch of the MFD becomes problematic. Specifically, the mismatch of the MFD causes a loss at a connection point. Further, when a constructor checks whether or not there are any abnormal points or the like on a light beam path, by using an OTDR or the like, a difference in level occurs at the connection point between the low bending loss optical fiber and the SSMF, and for a reason such as difficulty of a distinction between it and an abnormal point, it becoming an obstacle to an inspection also becomes problematic.

The present invention has been made in view of the above circumstances and has an object to provide an optical fiber in which it is possible to reduce bending loss while suppressing a reduction in MFD.

Means for Solving the Problems

In order to solve the above problems, according to an aspect of the present invention, an optical fiber includes: a core; and a clad which is formed so as to surround an outer circumference of the core concentrically with the core, the clad having at least an inner cladding layer adjacent to the outer circumference of the core and an outer cladding layer formed on an outer circumference of the inner cladding layer. In a case where a refractive index of the core is $\Delta 1$, a maximum refractive index of the core is $\Delta 1 max$, and an outer circumference radius of the core is r1, a refractive index of the inner cladding layer is $\Delta 2$, a minimum refractive index of the inner cladding layer is $\Delta 2 min$, and an outer circumference radius of the inner cladding layer is r2, a refractive index of the outer cladding layer is $\Delta 3$, and an outer circumference radius of the outer cladding layer is r3, a relationship of $\Delta 1 max > \Delta 3 > \Delta 2 min$ is satisfied, a relationship of $\Delta 3 - \Delta 2 min \leq 0.08\%$ is satisfied, a relationship of $r1 < r2 < r3$ is satisfied, a relationship of $0.35 \leq r1/r2 \leq 0.55$ is satisfied, a cable cut-off wavelength is less than or equal to 1260 nm, and an MFD at a wavelength of 1310 nm is 8.6 μm to 9.2 μm.

A loss increase at 1550 nm when being wound 10 times around a mandrel having a radius of 15 mm may be less than or equal to 0.02 dB, a loss increase at 1550 nm when being wound once around a mandrel having a radius of 10 mm may be less than or equal to 0.2 dB, and a sandpaper tension winding loss increase at a wavelength of 1550 nm, of an optical fiber element wire, may be less than or equal to 0.3 dB/km.

A sandpaper tension winding loss increase at a wavelength of 1550 mm, of an optical fiber element wire, may be less than or equal to 0.15 dB/km.

A sandpaper tension winding loss increase at a wavelength of 1550 nm, of an optical fiber element wire, may be less than or equal to 0.10 dB/km.

A relationship of $0.45 \leq r1/r2 \leq 0.5$ may be satisfied.

A relationship of $\Delta 3 - \Delta 2 min \leq 0.05\%$ may be satisfied.

The MFD at a wavelength of 1310 nm may be 8.8 μm to 9.2 μm.

Effects of Invention

According to the above aspect of the present invention, it is possible to reduce a bending loss while suppressing a reduction in MFD of an optical fiber.

BRIEF DESCRIPTION OF THE DRAWINGS

FIG. 1 is a schematic view showing a refractive index profile of an optical fiber according to an embodiment of the present invention.

EMBODIMENTS FOR CARRYING OUT THE INVENTION

Hereinafter, the present invention will be described based on a preferred embodiment.

In this embodiment, a design area of an optical fiber has been found in which it is possible to achieve both of the low bending loss characteristics of the level capable of being mounted in a small-diameter and high-density cable, and the same level of MFD as a SSMF, although it has been hitherto considered to be difficult to achieve. By an optical fiber according to this embodiment, it is possible to realize a small-diameter and high-density optical cable in which space-saving is possible, without causing mismatch of the MFD.

A plurality of categories of a single-mode optical fiber (SMF) is defined in the ITU-T G.652 (Characteristics of a single-mode optical fiber and cable) recommended from the Telecommunication Standardization Sector of the International Telecommunication Union. In any of the ITU-T G.652.A, the ITU-T G.652.B, the ITU-T G.652.C, and the ITU-T G.652.D, the same optical fiber characteristics are defined, and in this embodiment, the optical fiber characteristics are defined as the characteristics of a general-purpose optical fiber (SSMF, Standard single-mode fiber).

The optical fiber characteristics according to the ITU-T G.652 are as follows.

The mode field diameter (MFD) is in a range of 8.6 μm to 9.5 μm (tolerance: ±0.6 μm) at a wavelength of 1310 nm.

The diameter of a clad is 125.0 μm (tolerance: ±1 μm).

The eccentricity of a core is a maximum of 0.6 μm.

The non-circularity of the clad is a maximum of 1.0%.

A cable cut-off wavelength is a maximum of 1260 nm.

A macro-bending loss is 0.1 dB at the maximum in a radius of 30 mm, 100 turns, and a wavelength of 1625 nm.

Proof stress is a minimum of 0.69 GPa.

With respect to a chromatic dispersion coefficient, a minimum zero-dispersion wavelength $\lambda_{0min}$ is 1300 mm, a maximum zero-dispersion wavelength $\lambda_{0max}$ is 1324 nm, and a maximum zero-dispersion slope $S_{0max}$ is 0.092 ps/nm²×km.

In general, the SSMF is used near a transmission system-based transceiver. In order to reduce a splice loss caused by mismatch of the MFD, or a difference in level at an OTDR waveform, it is desirable that even an optical fiber which is mounted in the small-diameter and high-density cable fall within the G.652 standard, that is, that the MFD at a wavelength of 1310 nm be within a range of 8.6 μm to 9.5 μm. Further, in a SSMF product which is typified by "FutureGuide (registered trademark)-LWP single-mode fiber" (manufactured by Fujikura Ltd.), in most cases, the standard value of the MFD (1.31 μm) is 9.2±0.4 μm. For this reason, it is more preferable that the optical fiber of this embodiment have an MFD greater than or equal to 8.8 μm.

As a major optical property defined in G.652, other than the MFD, a cable cut-off wavelength (λcc) can be adopted. Accordingly, an optical fiber is required which has the above-described MFD, satisfies the characteristic in which the cable cut-off wavelength is less than or equal to 1260 nm, and obtains the bending loss characteristics of the level capable of being mounted in the small-diameter and high density cable.

As the bending loss characteristics of an optical fiber, there are two losses; a loss due to macro bending (a macro-bending loss) and a loss due to micro bending (a micro-bending loss). For the small-diameter and high density cable, it is required that either of the bending loss characteristics to be low (good).

The micro-bending loss is evaluated by, for example, a sandpaper tension winding loss increase described in Document 1 (Japanese Patent No. 3725523). The sandpaper tension winding loss increase is measured by the following method.

A transmission loss is measured in a state where a sandpaper (SiC having an average particle size of 50 Lm (for example, model number #360)) is wound around a body portion of a bobbin having a body diameter of 380 mm and an optical fiber element wire is wound around the periphery thereof by one layer with 100 gf. Thereafter, a transmission loss is measured in a state where the optical fiber element wire is reeled out from the bobbin and tension is hardly applied (such a state is referred to as a bundle without tension). Then, the difference between these transmission losses is determined and referred to as a sandpaper tension winding loss increase ($\Delta\alpha$).

Here, the optical fiber element wire is an optical fiber in which the outer circumference of a bare optical fiber is coated with UV curable resin or the like. Further, the bare optical fiber is an optical fiber in which coating with a resin or the like is not made in a state of being drawn from an optical fiber preform. In this embodiment, in a case of being stated simply as an optical fiber, it may be either of the bare optical fiber or the optical fiber element wire.

Whether or not an optical fiber can be mounted in the small-diameter and high-density cable is eventually determined by evaluating temperature dependence (cable characteristics) of a transmission loss after mounting in the cable. Specifically, whether or not the amount of variation of a transmission loss satisfies 0.15 dB/km or less when applying a change in temperature defined in, for example, IEC60794-3-11 (the low temperature side is in a range of −40° C. to −45° C. and the high temperature side is in a range of +60° C. to +70° C., and 2-cycle) is one of the indicators.

On the other hand, the cable characteristics are greatly affected by the macro-bending loss and the micro-bending loss of an optical fiber. For this reason, by evaluating these two bending loss characteristics at the stage of an optical fiber element wire, it is also possible to determine whether or not it can be mounted in the small-diameter and high-density cable.

FIG. 1 shows a schematic diagram of a refractive index profile of the optical fiber according to this embodiment. The refractive index profile is a shape in which a depressed structure is applied to a core region. The optical fiber has a core 11 and a clad 14. In the cross section perpendicular to a longitudinal direction of the optical fiber, the core 11 is provided at a central portion. Similarly, the clad 14 surrounds an outer circumference of the core 11 concentrically with the core 11. The clad 14 has at least an inner cladding layer 12 adjacent to the outer circumference of the core 11, and an outer cladding layer 13 provided at the outer circumference of the inner cladding layer 12.

The refractive index of the core 11 is $\Delta1$ and the outer circumference radius is r1. The refractive index of the inner cladding layer 12 is $\Delta2$ and the outer circumference radius is r2. The refractive index of the outer cladding layer 13 is $\Delta3$ and the outer circumference radius is r3. In FIG. 1, each of the refractive indexes $\Delta1$, $\Delta2$, and $\Delta3$ of the respective portions is shown as a constant value. However, the refractive index of each portion may have a distribution in which a refractive index is different according to a position in a radial direction. $\Delta1$, $\Delta2$, and $\Delta3$ may be defined as relative refractive index differences.

Each of the outer circumference radii r1, r2, and r3 is the distance from a center 15 of the optical fiber to the outer circumference of each portion. In a case where the cross section perpendicular to the longitudinal direction of the optical fiber has a circular shape, the center 15 of the optical fiber may be the center of the circle. The outer circumference radii satisfy the relationship of r1<r2<r3. The outer circumference radius r3 of the outer cladding layer 13 may be ½ of the diameter of the clad.

When the maximum value of the refractive index $\Delta 1$ of the core 11 is $\Delta 1max$ and the minimum value of the refractive index $\Delta 2$ of the inner cladding layer 12 is $\Delta 2min$, the relationship of $\Delta 1max > \Delta 3 > \Delta 2min$ is satisfied. When a case where the refractive index $\Delta 3$ of the outer cladding layer 13 is not a constant value is also taken into account, if the maximum value thereof is $\Delta 3max$ and the minimum value is $\Delta 3min$, the relationship of $\Delta 1max > \Delta 3max \geq \Delta 3min > \Delta 2min$ may be satisfied. Further, a range defining each of $\Delta 3max$ and $\Delta 3min$ is not limited to the entire area of the outer cladding layer 13 and can also be an area affecting optical properties, for example, an area from the outer circumference radius r2 to twice r2. Outside of this area, $\Delta 3$ can be out of the defined range.

In order to solve the above problems, it is preferable that the optical fiber according to this embodiment have the relationships of $\Delta 3 - \Delta 2min \leq 0.08\%$ and $0.35 \leq r1/r2 \leq 0.55$. Further, the relationship of $\Delta 3 - \Delta 2min \leq 0.05\%$ is particularly preferable. The relationship of $0.45 \leq r1/r2 \leq 0.5$ is particularly preferable. When a case where the refractive index $\Delta 3$ of the outer cladding layer 13 is not a constant value is also taken into account, instead of $\Delta 3 - \Delta 2min$, it is also possible to use a value such as $\Delta 3max - \Delta 2min$ or $\Delta 3min - \Delta 2min$.

It is preferable that $\lambda cc$ of the optical fiber be less than or equal to 1260 nm. Further, it is preferable that the MFD at a wavelength of 1310 nm be 8.6 μm to 9.2 μm, and it is particularly preferable that the MFD be 8.8 μm to 9.2 μm.

As the macro-bending loss, it is preferable that a loss increase at 1550 nm when being wound 10 times around a mandrel having a radius of 15 mm be less than or equal to 0.02 dB and a loss increase at 1550 nm when being wound once around a mandrel having a radius of 10 mm be less than or equal to 0.2 dB.

Although an optical fiber which is used in the measurement of the macro-bending loss is not particularly limited, it may be an optical fiber element wire.

As the micro-bending loss, it is preferable that the sandpaper tension winding loss increase at a wavelength of 1550 nm, of the optical fiber element wire, be less than or equal to 0.3 dB/km. Further, it is more preferable that the sandpaper tension winding loss increase at a wavelength of 1550 nm, of the optical fiber element wire, be less than or equal to 0.15 dB/km. Further, it is particularly preferable that the sandpaper tension winding loss increase at a wavelength of 1550 nm, of the optical fiber element wire, be less than or equal to 0.10 dB/km. Although the optical fiber element wire which is used in the measurement of the micro-bending loss is not particularly limited, an optical fiber element wire in which the outer circumference of the clad is coated with usual UV curable resin can be adopted.

The core 11 and the clad 14 are usually configured of a silica-based glass material. The silica-based glass is silica ($SiO_2$) and may include a dopant. Any of the core 11, the inner cladding layer 12, and the outer cladding layer 13 can also be made of pure silica which does not include a dopant, and each of them can also be made of silica which includes a dopant. As the dopant, one type or two or more types of Ge, B, Al, P, F, Cl, Na, K, or the like can be adopted. It is possible to make the type, the combination, the concentration, and the like of the dopant different for each portion.

In the case of the optical fiber element wire, one or two or more coating layers of plastic, for example, UV curable resin or the like are provided on the outer circumference of the clad 14. As a primary coating layer adjacent to the outer circumference of the clad. UV curable resin or the like, which has a Young's modulus less than or equal to 1.0 MPa, is preferable. As a secondary coating layer which is provided on the outer circumference of the primary coating layer, UV curable resin or the like, which has a Young's modulus greater than or equal to 500 MPa, is preferable. As the UV curable resin which can be used in each coating layer, urethane acrylate-based resin, polybutadiene acrylate-based resin, epoxy acrylate-based resin, silicone acrylate-based resin, polyester acrylate-based resin, or the like can be adopted as an example.

As the clad diameter (the outer diameter) of the optical fiber, a diameter in a range of 100 μm to 125 μm can be adopted as an example. As the outer diameter of the primary coating layer, a diameter in a range of 130 μm to 250 μm can be adopted. As the outer diameter of the secondary coating layer, a diameter in a range of 160 μm to 400 μm can be adopted. The shape of each of the core 11, the inner cladding layer 12, and the outer cladding layer 13 may be a substantially concentric circle shape in a cross section.

The present invention has been described above, based on the preferred embodiment. However, the present invention is not limited to the embodiment described above, and various modifications can be made within a scope which does not depart from the present invention.

The clad of the optical fiber may have only two portions; an inner cladding layer (a first cladding layer) and an outer cladding layer (a second cladding layer) toward the outer circumference from the core, and may further have other portions (a third cladding layer and the like) on the outer circumference of the second cladding layer. It is also possible to adopt, for example, a clad which is composed of the first to third cladding layers, a clad which is composed of the first to fourth cladding layers, or the like.

As the small-diameter and high-density cable, a structure in which the outer circumference of a cable core in which a plurality of optical fibers are assembled is coated with a protective tape, a cable sheath (jacket), or the like can be adopted. The cable core may not include a member for supporting the optical fiber, such as a slot rod, on the inside of the optical fiber. The number of cores of optical fiber element wires which are assembled in the cable core is in a range of 24 to 200 cores, for example. A tensile strength member such as a metal wire or a reinforcement fiber can also be embedded in the cable sheath.

Example

Hereinafter, the present invention will be specifically described with an example.

Table 1 shows the parameter values of a refractive index profile of an optical fiber of an example. The maximum refractive index $\Delta 1max$ of a core is equal to $\Delta 1$, and the minimum refractive index $\Delta 2min$ of an inner cladding layer is equal to $\Delta 2$. A relative refractive index difference was based on the value of $\Delta 3 = 0\%$.

TABLE 1

| | Example 1 |
|---|---|
| $\Delta 1$ [%] | 0.36 |
| $\Delta 2$ [%] | −0.05 |
| $\Delta 3$ [%] | 0.00 |
| r1 [μm] | 4.65 |
| r2 [μm] | 11.65 |

Table 2 shows the optical properties of the optical fiber of the example.

TABLE 2

|  | Example 1 |
|---|---|
| MFD [μm] (wavelength: 1.31 μm) | 9.0 |
| λcc [nm] | 1220 |
| Bending loss [dB/10 turns] (wavelength: 1.55 μm, radius: 15 mm) | 0.008 |
| Bending loss [dB/turn] (wavelength: 1.55 μm, radius: 10 mm) | 0.04 |
| Wavelength dispersion [ps/km/nm] (wavelength: 1.31 μm) | 0.76 |

From Table 2, the optical fiber of Table 1 has the same characteristics as those of the SSMF, that is, the value of the MFD (wavelength: 1.31 μm) is greater than or equal to 8.8 μm and the value of λcc (cable cut-off wavelength) is less than or equal to 1260 nm. Further, the optical fiber satisfies a low bending loss (less than or equal to 0.02 dB/10 turns at a wavelength of 1.55 μm and a radius of 15 mm, and less than or equal to 0.2 dB/turn at a wavelength of 1.55 μm and a radius of 10 mm) which is required for the small-diameter and high-density cable.

Table 3 shows the result of the sandpaper tension winding loss increase of the optical fiber of the example. Further, Table 3 also shows the evaluation result of the SSMF as a reference value. As seen in Table 3, it can be seen that in the optical fiber of the example, a lower value than in the SSMF is obtained.

TABLE 3

|  | Example 1 | SSMF |
|---|---|---|
| Sandpaper tension winding loss increase [dB/km] (wavelength: 1.55 μm) | 0.08 | 0.2 to 0.5 |

From the above results, it can be seen that the optical fiber of the example is an optical fiber having bending characteristics capable of being mounted in the small-diameter and high-density cable and having the same MFD as that of the SSMF.

DESCRIPTION OF REFERENCE NUMERAL $\Delta 1$: refractive index of core
$\Delta 2$: refractive index of inner cladding layer
$\Delta 3$: refractive index of outer cladding layer
r1: outer circumference radius of core
r2: outer circumference radius of inner cladding layer
r3: outer circumference radius of outer cladding layer
11: core
12: inner cladding layer
13: outer cladding layer
14: clad
15: center of optical fiber

The invention claimed is:

1. An optical fiber comprising:
a core; and
a clad which is formed so as to surround an outer circumference of the core concentrically with the core, the clad having at least an inner cladding layer adjacent to the outer circumference of the core and an outer cladding layer formed on an outer circumference of the inner cladding layer,
wherein in a case where a refractive index of the core is $\Delta 1$, a maximum refractive index of the core is $\Delta 1max$, and an outer circumference radius of the core is r1,
a refractive index of the inner cladding layer is $\Delta 2$, a minimum refractive index of the inner cladding layer is $\Delta 2min$, and an outer circumference radius of the inner cladding layer is r2, and
a refractive index of the outer cladding layer is $\Delta 3$, and an outer circumference radius of the outer cladding layer is r3,
a relationship of $\Delta 1max > \Delta 3 > \Delta 2min$ is satisfied,
a relationship of $\Delta 3 - \Delta 2min \leq 0.08\%$ is satisfied;
a relationship of $r1 < r2 < r3$ is satisfied,
a relationship of $0.35 \leq r1/r2 \leq 0.5$ is satisfied,
a cable cut-off wavelength is less than or equal to 1260 nm, and
an MFD at a wavelength of 1310 nm is 8.8 μm to 9.2 μm.

2. The optical fiber according to claim 1, wherein a loss increase at 1550 nm when being wound 10 times around a mandrel having a radius of 15 mm is less than or equal to 0.02 dB, a loss increase at 1550 nm when being wound once around a mandrel having a radius of 1.0 mm is less than or equal to 0.2 dB, and a sandpaper tension winding loss increase at a wavelength of 1550 nm, of an optical fiber element wire, is less than or equal to 0.3 dB/km.

3. The optical fiber according to claim 1, wherein a sandpaper tension winding loss increase at a wavelength of 1550 nm, of an optical fiber element wire, is less than or equal to 0.15 dB/km.

4. The optical fiber according to claim 1, wherein a sandpaper tension winding loss increase at a wavelength of 1550 nm, of an optical fiber element wire, is less than or equal to 0.10 dB/km.

5. The optical fiber according to claim 1, wherein a relationship of $0.4 \leq r1/r2 \leq 0.5$ is satisfied.

6. The optical fiber according to claim 1, wherein a relationship of $\Delta 3 - \Delta 2min \leq 0.05\%$ is satisfied.

* * * * *